United States Patent
Yang et al.

(10) Patent No.: US 10,044,970 B2
(45) Date of Patent: Aug. 7, 2018

(54) IMAGE PROCESSING APPARATUS AND IMAGE PROCESSING METHOD

(71) Applicant: ATEN International Co., Ltd., New Taipei (TW)

(72) Inventors: Shang-Yi Yang, New Taipei (TW); Jian-Liang Che, New Taipei (TW); Ming-Chen Hsu, New Taipei (TW)

(73) Assignee: ATEN INTERNATIONAL CO., LTD., New Taipei (TW)

( * ) Notice: Subject to any disclaimer, the term of this patent is extended or adjusted under 35 U.S.C. 154(b) by 0 days.

(21) Appl. No.: 15/374,280

(22) Filed: Dec. 9, 2016

(65) Prior Publication Data

US 2017/0171493 A1   Jun. 15, 2017

(30) Foreign Application Priority Data

Dec. 15, 2015   (TW) .............................. 104142133 A

(51) Int. Cl.
*H04N 5/445* (2011.01)
*G06F 3/14* (2006.01)

(52) U.S. Cl.
CPC ....... *H04N 5/44513* (2013.01); *G06F 3/1423* (2013.01); *G06F 3/1438* (2013.01);
(Continued)

(58) Field of Classification Search
CPC .......... H04N 5/44513; H04N 5/44591; H04N 2005/44534
(Continued)

(56) References Cited

U.S. PATENT DOCUMENTS 6,522,309 B1   2/2003   Weber
6,803,945 B1 * 10/2004   Needham ......... G08B 13/19602
                                                            348/155

(Continued)

FOREIGN PATENT DOCUMENTS

TW    201104669 A    2/2011
TW    201340684 A    10/2013
(Continued)

OTHER PUBLICATIONS

Taiwanese Office Action, dated Sep. 23, 2016, in a counterpart Taiwanese patent application, No. TW 104142133.
(Continued)

*Primary Examiner* — Michael Lee
(74) *Attorney, Agent, or Firm* — Chen Yoshimura LLP

(57) ABSTRACT

An image processing apparatus is disclosed. The splitter duplicates an original image signal into a first image signal and a second image signal. The first signal converter converts the second image signal having a first image format to the second image signal having a second image format. The image processor stores the second image signal in the memory according to an enable signal and continuously compares whether the current frame of the second image signal is the same as the previous frame of the second image signal. If they are different, the image processor continuously receives the second image signal and stores it in the memory. If they are the same, the image processor stops receiving the second image signal. The second converter converts the second image signal having the second image format to the second image signal having the first image format.

10 Claims, 3 Drawing Sheets

(52) U.S. Cl.
CPC . *G09G 2340/0442* (2013.01); *G09G 2340/14* (2013.01); *G09G 2360/127* (2013.01); *G09G 2360/18* (2013.01); *H04N 2005/44534* (2013.01)

(58) Field of Classification Search
USPC .......................................... 348/572
See application file for complete search history.

(56) References Cited

U.S. PATENT DOCUMENTS

| | | |
|---|---|---|
| 8,065,707 B1 | 11/2011 | Matic et al. |
| 8,320,857 B2 | 11/2012 | Kyranas et al. |
| 2006/0274158 A1* | 12/2006 | Tatsumi ................. H04N 7/012 348/222.1 |
| 2007/0248166 A1* | 10/2007 | Chen ....................... H04N 19/51 375/240.16 |
| 2011/0222556 A1* | 9/2011 | Shefler ................... H04N 7/122 370/465 |
| 2013/0155090 A1* | 6/2013 | Pourbigharaz ........ G06F 1/3218 345/589 |
| 2013/0336381 A1 | 12/2013 | Cheng et al. |
| 2014/0023350 A1 | 1/2014 | Yang et al. |
| 2014/0028808 A1 | 1/2014 | Rui |
| 2014/0152715 A1 | 6/2014 | Wen |
| 2015/0002624 A1* | 1/2015 | Terai .................. H04N 13/0029 348/42 |

FOREIGN PATENT DOCUMENTS

| | | |
|---|---|---|
| TW | I419043 | 12/2013 |
| TW | 201401882 A | 1/2014 |
| TW | 201406156 | 2/2014 |
| TW | 201531105 A | 8/2015 |

OTHER PUBLICATIONS

Taiwanese Office Action, dated Apr. 6, 2017, in a counterpart Taiwanese patent application, No. TW 104142133.

* cited by examiner

US 10,044,970 B2

IMAGE PROCESSING APPARATUS AND IMAGE PROCESSING METHOD

BACKGROUND OF THE INVENTION

Field of the Invention

This invention relates to image processing, and in particular, it relates to an image processing device and method that achieves dual view display.

Description of Related Art

With the technological advancement and improvement of living standard, various new entertainment devices such as video entertainment and computer game devices are developed. For example, Microsoft developed Xbox and Xbox360 devices, Sony developed PS3 and PS4, and Nintendo developed Wii, etc. The wide availability of various entertainment devices gives people more choices for their leisure time and makes their entertainment activities more colorful.

Refer to FIG. 1, which illustrates a conventional computer system. When playing computer games or executing an application program on the personal computer (PC) 10, to achieve a dual view function, i.e., to simultaneously display video signals from the PC 10 on display devices 16 and 18, the graphics card 12 on the PC 10 must have two video outputs 13 and 14, and the graphics card 12 must also have a graphics processing unit (GPU), in order to realize dual view.

Refer to FIG. 2, which illustrates a conventional game system. A conventional game console 20 only has a single video output 22, so it can only display the game images on one display device 24. If the player wishes to switch to an auxiliary image (such as a tool box or map) during game play, because the game console 20 does not have a dual view function, the game player can only view either the main game image or the auxiliary image on the display device 24 at any given time, and cannot view both the main game image or the auxiliary image simultaneously. This reduces the game play effectiveness and smoothness.

Currently there is no good solution for realizing dual view for a source device that has only a single video output.

SUMMARY

Accordingly, the present invention is directed to an image processing apparatus which can realize a dual view function for a source device that has only a single video output, without requiring a GPU, which solves the above described problems of the conventional technology.

The present invention is also directed to an image processing method which can realize dual view when only a single input video signal is received.

In one aspect, the present invention provides an image processing device, which includes an image splitter, a first signal converter, a memory, an image processor and a second signal converter. The image splitter is for receiving an original image signal having a first image format, and duplicating the original image signal into a first image signal and a second image signal. The first signal converter is for receiving the second image signal having the first image format, and converting the second image signal to a second image signal having a second image format. The image processor is for receiving the second image signal having the second image format from the first signal converter, storing the second image signal in the memory based on an enable signal, and continuously comparing whether or not a current frame of the second image signal is the same as a previous frame, wherein when the current frame of the second image signal is different from the previous frame, the image processor continuously receiving the second image signal and storing the second image signal in the memory, and wherein when the current frame of the second image signal is the same as the previous frame, the image processor stopping receiving the second image signal. The second signal converter is for receiving the second image signal having the second image format from the image processor, and converting the second image signal to the second image having the first image format.

In another aspect, the present invention provides an image processing method, which includes: receiving an original image signal; duplicating the original image signal into a first image signal and a second image signal; storing the second image signal in a memory based on an enable signal; continuously comparing a current frame of the second image signal to a previous frame to determine if they are the same; when the current frame of the second image signal is different from the previous frame, continuously receiving the second image signal and storing it in the memory; and when the current frame of the second image signal is the same as the previous frame, stopping receiving the second image signal.

It is to be understood that both the foregoing general description and the following detailed description are exemplary and explanatory and are intended to provide further explanation of the invention as claimed.

DETAILED DESCRIPTION OF PREFERRED EMBODIMENTS

Figure 1:
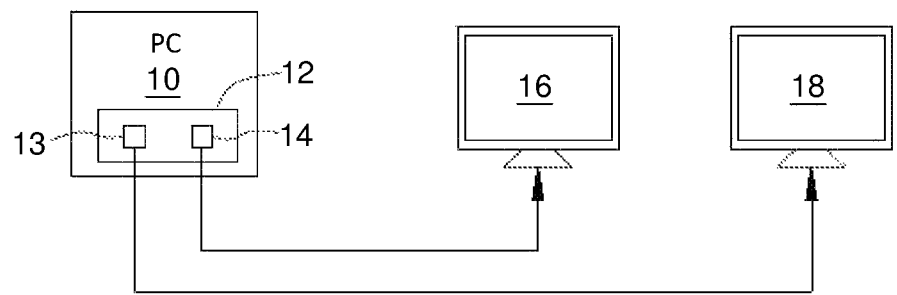
FIG. 1 schematically illustrates a conventional computer system.
Figure 2:
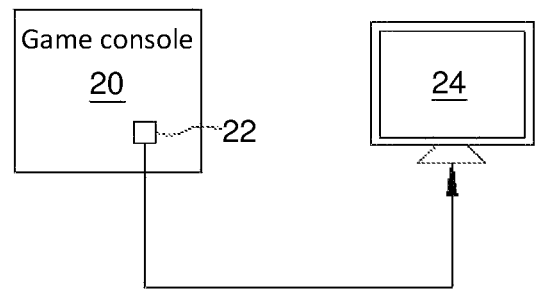
FIG. 2 schematically illustrates a conventional game system.
Figure 3:
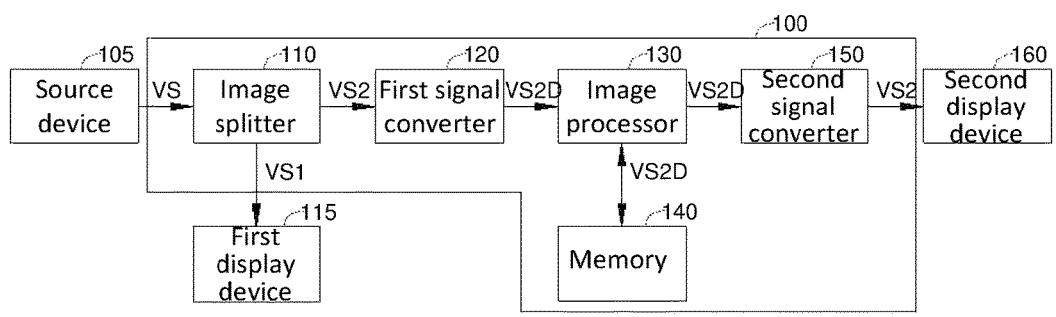
FIG. 3 is a block diagram of an image processing device according to an embodiment of the present invention.

Refer to FIG. 3, which is a block diagram of an image processing device according to embodiments of the present invention. The image processing device 100 of this embodiment includes an image splitter 110, a first signal converter 120, an image processor 130, a memory 140 and a second signal converter 150. The image splitter 110 receives, from a source device 105, an original image signal VS having a first image format, duplicates the original image signal VS into a first image signal VS1 and a second image signal VS2, and respectively outputs them to a first display device 115 to be displayed and to the first signal converter 120 to be processed. The source device 105 may be, without limitation, a PC or game console.

The first signal converter 120 receives the second image signal VS2 which has the first image format, and converts the second image signal VS2 to a second image signal VS2D which has a second image format. In one embodiment, when the first image format is an analog format such as video graphics array (VGA), then the first signal converter 120 is an analog to digital converter, and the second signal converter 150 is a digital to analog converter. In another embodiment, when the first image format is a digital format such as transition-minimized differential signaling (TMDS) signal, then the first signal converter 120 is a first digital to digital converter, and the second signal converter 150 is a second digital to digital converter. In a preferred embodiment, the second image format may be, without limitation, a digital format such as low-voltage differential signaling (LVDS) or transistor-transistor logic (TTL).

The image processor 130 receives the second image signal VS2D having the second image format from the first signal converter 120, and stored the second image signal VS2D in the memory 140 based on an enable signal. The image processor 130 may be, without limitation, field-programmable gate array (FPGA), and the memory 140 is preferably a buffer memory. The enable signal may be triggered, for example, by an input by the game player using a peripheral device such mouse, keyboard or joystick, or set to be automatically triggered.

In a preferred embodiment, after the image processor 130 receives the second image VS2D, the image processor 130 continuously compares whether or not the current frame of the second image signal VS2D is the same as the previous frame. When the current frame of the second image signal VS2D is different from the previous frame, the image processor 130 continuously receives the second image signal VS2D and stores the second image signal VS2D in the memory 140. When the current frame of the second image signal VS2D is the same as the previous frame, the image processor 130 immediately stops receiving the second image signal VS2D. It should be noted that the second image signal VS2D stored in the memory 140 may be still images (such as a screenshot of a game image or document processing image) or moving images (such as game video images). Also, if the memory 140 is full, it may be set to stop storing newly received second image signal VS2D, or to continue to store newly received second image signal VS2D by sequentially overwriting previously stored data.

The second signal converter 150 receives the second image signal VS2D having the second image format from the image processor 130, converts the second image signal VS2D to the second image signal VS2 having the first image format, and outputs the second image signal VS2 to the second display device 160 to be displayed.

Figure 4:
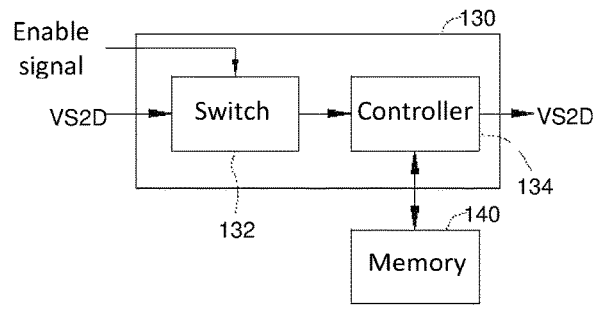
FIG. 4 is a block diagram of an image processor according to an embodiment of the present invention.

Refer to FIG. 4, which is a block diagram of an image processor according to an embodiment of the present invention. The image processor 130 includes a switch 132 and a controller 134, where the switch 132 is preferably, but not limited to, a multiplexer. The switch 132 receives the second image signal VS2D from the first signal converter 120, and determines its own switching On/Off state based on the enable signal. The controller 134 receives the second image signal VS2D from the switch 132 and stores the second image signal VS2D in the memory 140.

Refer to FIGS. 3 and 4, in a preferred embodiment, the enable signal is pre-set to an automatic trigger state, i.e., when the image processor shown in FIG. 3 starts up, the enable signal is directly triggered to turn the switch 132 On, so the second image signal VS2D can be transmitted via the switch 132 to the controller 134. Thereafter, the controller 134 continuously compares whether or not the current frame of the second image signal VS2D and the previous frame are the same. When the current frame of the second image signal VS2D is different from the previous frame, the switch 132 is maintained in the On state, and the controller 134 continues to receive the second image signal VS2D and stores the second image signal VS2D in the memory 140. Thereafter, the controller 134 retrieves the second image signal VS2D from the memory 140 and output the second image signal VS2D to the second signal converter 150, so that the second image signal VS2 is displayed on the second display device 160 immediately.

As mentioned earlier, when the controller 134 receives the second image signal VS2D, the controller 134 continuously compares whether or not the current frame of the second image signal VS2D and the previous frame are the same. In the preferred embodiment, when the controller 134 determines that the current frame of the second image signal VS2D is the same as the previous frame, the enable signal causes the switch 132 to be in the Off state; at this time, the controller 134 is in a freeze state, i.e., it temporarily does not receive the second image signal VS2D from the first signal converter 120.

Thereafter, the player can use a peripheral device such as mouse, keyboard, joystick, etc. to issue a command to the controller 134, causing the controller 134 to retrieve the previously stored second image signal VS2D from the memory 140, such as still or moving images, and display the second image signal VS2D on the second display device 160. This accomplishes a dual view function. In a preferred embodiment, when the controller 134 is in the freeze state, the player may retrieve the previously stored second image signal VS2D from the memory 140, for example, all or part of the second image signal VS2D may be retrieved and displayed on the second display device 160.

Thus, the image processing device according to embodiments of the present invention can achieve a dual view function for a source device 105 that only has a single signal output, without requiring a GPU. Taking a game console as an example, the image processing device according to embodiments of the present invention can display the main game play images on the first display device 115, and at the same time displays auxiliary images on the second display device 160. This can improve the effectiveness and smoothness of the game play and significantly reduce game image switching time.

Figure 5:
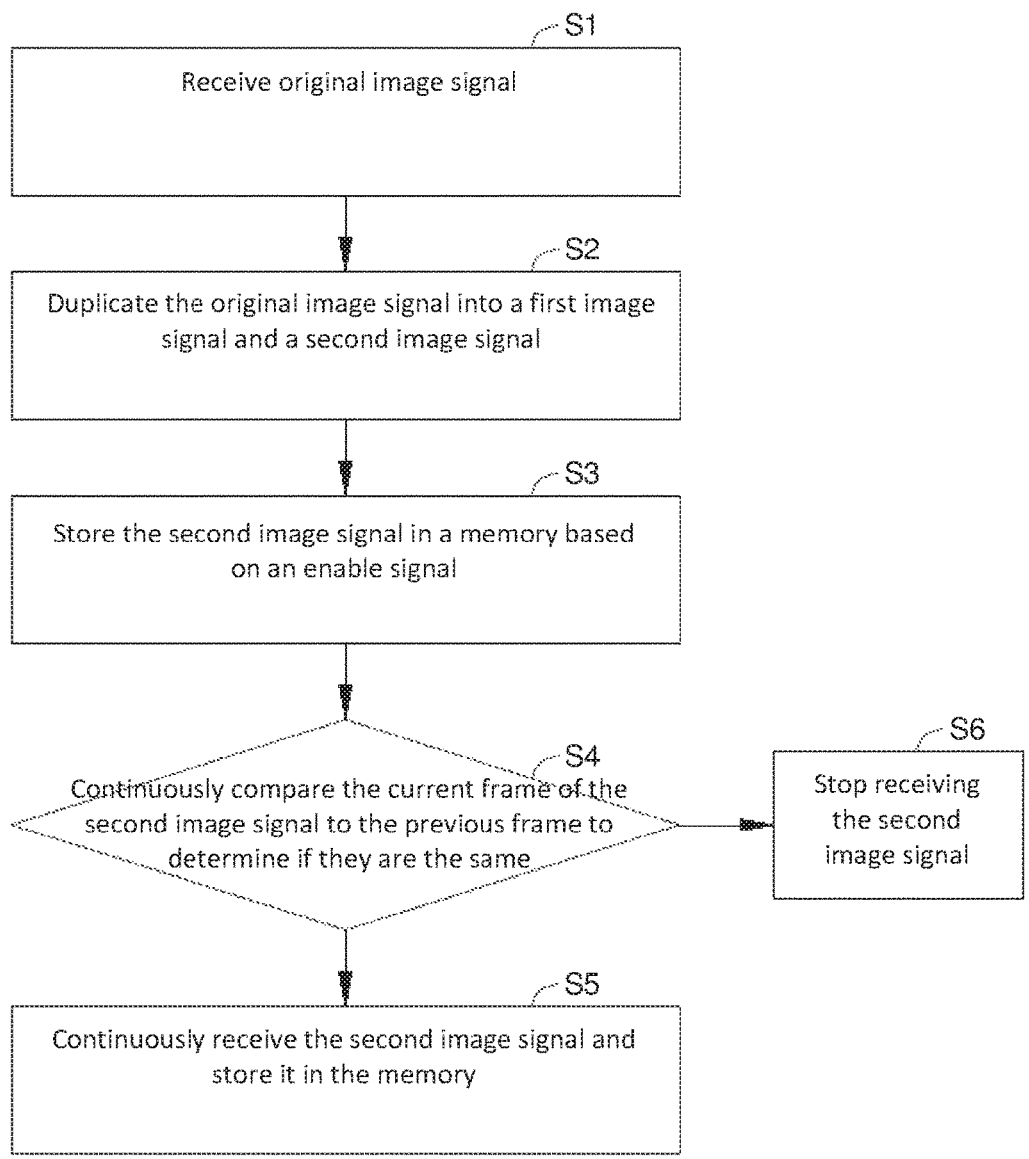
FIG. 5 is a flow diagram of an image processing method according to an embodiment of the present invention.

Refer to FIG. 5, which is a flow diagram of an image processing method according to embodiments of the present invention. As shown in FIG. 5, the image processing method according to embodiments of the present invention includes the following steps: First, in step S1, the original image signal is received. Then, in step S2, the original image signal is duplicated into a first image signal and a second image signal. In one embodiment, after step S2, the first image signal is output to a first display device to be displayed. Further, if the original image signal is an analog format, then after step S2, a second image signal in this analog format is received and is converted to a second image signal in a digital format.

Thereafter, in step S3, the second image signal is stored in a memory based on an enable signal. The second image signal may be still image or moving image signals. In one embodiment, after step S3, the second image signal is retrieved form the memory and output to a second display device to be displayed. Further, after retrieving the second image signal from the memory, the second image signal in the digital format is converted to a second image signal in an analog format, and then output to the second display device to be displayed.

Then, in step S4, the current frame of the second image signal is continuously compared to the previous frame to determine if they are the same. When the current frame of the second image signal is different from the previous frame, step S5 is performed, where the second image signal is continuously received and stored in the memory. When the current frame of the second image signal is the same as the previous frame, step S6 is performed, i.e., receiving of the second image signal is stopped. In a preferred embodiment, after step S6, the previously stored second image signal is retrieved from the memory, such as still images or moving images, and displayed on the second display device.

Thus, the image processing method according to embodiments of the present invention can achieve a dual view function for a source device that only has a single signal output.

It will be apparent to those skilled in the art that various modification and variations can be made in the image processing apparatus and method of the present invention without departing from the spirit or scope of the invention. Thus, it is intended that the present invention cover modifications and variations that come within the scope of the appended claims and their equivalents.

What is claimed is:

1. An image processing device, comprising:
   an image splitter, for receiving an original image signal having a first image format, and duplicating the original image signal into a first image signal and a second image signal;
   a first signal converter, for receiving the second image signal having the first image format, and converting the second image signal to a second image signal having a second image format;
   a memory;
   an image processor, comprising:
      a switch for receiving the second image signal having the second image format from the first signal converter, the switch being configured to turn On/Off based on an On/Off state of an enable signal; and
      a controller for receiving the second image signal from the switch, storing the second image signal in the memory, and continuously comparing whether or not a current frame of the second image signal is the same as a previous frame, wherein when the current frame of the second image signal is different from the previous frame, the controller continuously receiving the second image signal and storing the second image signal in the memory, and wherein when the current frame of the second image signal is the same as the previous frame, the controller generating the enable signal of the Off state and applying the enable signal to the switch to turn the switch Off; and
   a second signal converter, for receiving the second image signal having the second image format from the image processor, and converting the second image signal to the second image having the first image format.

2. The image processing device of claim 1, wherein the image splitter further outputs the first image signal having the first image format to a first display device to be displayed, and wherein the second signal converter further outputs the second image signal having the first image format to a second display device to be displayed.

3. The image processing device of claim 1, wherein when the first image format is an analog format, the first signal converter is an analog to digital converter and the second signal converter is a digital to analog converter.

4. The image processing device of claim 1, wherein the controller further retrieves the second image signal from the memory and outputs the second image signal to the second signal converter.

5. The image processing device of claim 1, wherein the image processor is a field-programmable gate array (FPGA).

6. An image processing method, comprising:
   (a) receiving an original image signal;
   (b) duplicating the original image signal into a first image signal and a second image signal;
   (c) by a switch, receiving the second image signal and outputting the second image signal to a controller based on an On/Off state of an enable signal;
   (d) by the controller, receiving the second image signal from the switch and storing the second image signal in a memory;
   (e) by the controller, continuously comparing a current frame of the second image signal to a previous frame to determine if they are the same;
   (f) by the controller, when the current frame of the second image signal is different from the previous frame, continuously receiving the second image signal and storing the second image signal in the memory; and
   (g) by the controller, when the current frame of the second image signal is the same as the previous frame, generating the enable signal of the Off state and applying the enable signal to the switch to stop the switch from outputting the second image signal.

7. The image processing method of claim 6, further comprising, after step (b), outputting the first image signal to a first display device to be displayed.

8. The image processing method of claim 6, further comprising, after step (d), retrieving the second image signal form the memory and outputting the second image signal to a second display device to be displayed.

9. The image processing method of claim 6, wherein when the original image signal is an analog format, the method further comprises, after step (b), receiving the second image signal in the analog format and converting the second image signal to a second image signal in a digital format.

10. The image processing method of claim 9, further comprising, after step (d), receiving the second image signal in the digital format and converting the second image signal to the second image signal in the analog format.

* * * * *